Sept. 23, 1930.         T. MESSERMAN         1,776,474
METHOD AND MEANS FOR OBTAINING BALANCED OCCLUSION
Filed April 23, 1928

Inventor
Theodore Messerman
by
Atty.

Patented Sept. 23, 1930

1,776,474

UNITED STATES PATENT OFFICE

THEODORE MESSERMAN, OF CLEVELAND, OHIO

METHOD AND MEANS FOR OBTAINING BALANCED OCCLUSION

Application filed April 23, 1928. Serial No. 272,200.

My invention relates to a method and means for obtaining balanced occlusion upon artificial dentures or plates.

Heretofore after the plates were finished, balanced occlusion had been sought to be obtained upon an articulator which is supposed to simulate the motions of the human jaws as near as possible. With the aid of my device and by my invention, the articulator is dispensed with entirely and the entire operation of occlusion balancing is done within the patient's own mouth. This is quite an advantage and an improvement over the use of an articulator since it is impossible to simulate the exact motions of the human jaws on a mechanical device. The great defect and disadvantage due to the fact that the upper jaw is movable on the articulator whereas it is the lower one of the human mouth that is the movable jaw is overcome by the use of my invention. The articulator makes the same motions for all sets of plates while my invention enables the correct adjustment of the plates under the individual motions of the particular patient's own jaws and under his own masticatory stress.

Accordingly the principal object of my invention is to obviate the difficulties and uncertainties attending the old methods of obtaining occlusion of artificial dentures by using the patient's own mouth instead of an articulator to achieve perfect and complete contact of all the teeth. Another object is to obtain these results upon the plates in all their positions relative to each other.

My invention also includes all of the various novel steps and features of construction and arrangement of parts as hereinafter more definitely specified.

The invention will be more readily understood in connection with the accompanying drawings, wherein my device is illustrated and wherein like characters of reference indicate like parts throughout the several views.

Referring to the drawings.

Figure 1:
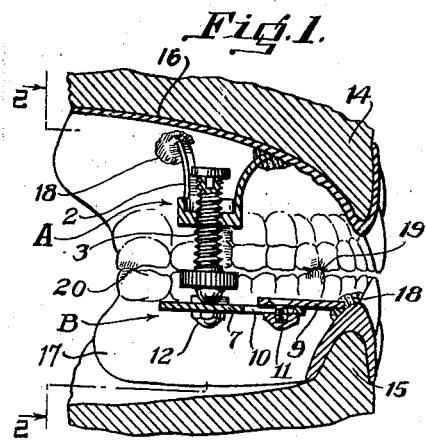
Fig. 1 is a longitudinal section through a patient's mouth showing the device in use.

The device is made up of two parts A and B, A being adapted for mounting upon the upper plate and B being adapted for mounting upon the lower plate. The part A has an internally threaded nut portion 1 which has a plurality of integrally formed, upwardly and outwardly extending legs 2 which are adapted to be affixed to the upper plate 16 by means of wax 18. Extending through the nut portion 1 is a threaded bolt 3 with a knurled head 5 on its lower end. Integral with the knurled head 5 is a semi-spherical portion 4 which is adapted to contact with the part of the device which rests upon the lower plate. A stop 6 may be provided at the upper end of the bolt 3 to keep it from being detached from the nut portion 1. In the form illustrated, the nut portion and legs are shown in the form of an inverted tripod which is the preferred form. If desired, the legs may be made adjustable (not shown) so as to adapt the device to use in mouths with exceptionally high roofs. It is preferable as shown to make one leg slightly shorter to allow for the downward slope toward the front of the upper plate. Another method (not shown) for adapting this device for use in various sized mouths would be to construct the nut portion 1 with a plurality of sockets to receive the legs 2 which may be held in place by small set screws. Different sizes of legs may be provided which may be interchanged according to the attending circumstances.

The portion 4 is made semi-spherical so that parts A and B of the device may very readily assume the various positions with respect to each other when the patient moves his jaws in the natural way.

The preferred form of the lower part B consists of a platform or plate portion 7 having a number of radial arms extending towards the sides and front of the lower plate and adapted to support the platform thereon as shown. The preferred form shows one front and two lateral arms 8 which have extensions 9 adjustable by means of slots 10 in the arms 8 and threaded bolts 11 fixed in the extensions 9 which are held in adjusted position by hexagonal capped nuts 12. Nuts 12 may be knurled so that they may be manipulated by hand. The outward ends of extensions 9 are slightly curved to conform to the teeth mounted in the lower plate.

Figure 7:
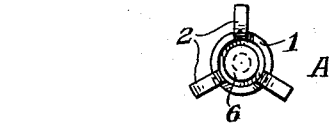
Fig. 7 is a plan view of a modified form of that part of the device which is mounted on the lower plate.
Figure 7:
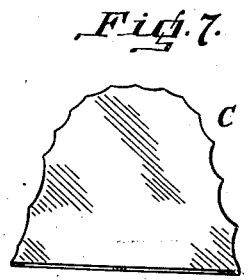

In Fig. 7 is shown a plate C which may be cut from a sheet of metal such as German silver to conform to the teeth set into the lower plate so as to rest thereon. This plate may be used in lieu of the lower part B of the device illustrated in Figures 1 to 4 but in such cases different plates have to be cut for various sizes of mouths for which plates are made.

Figure 2:
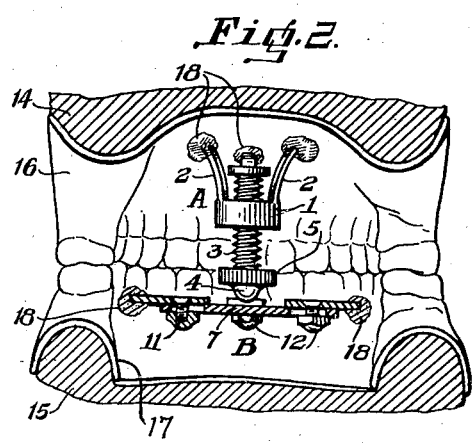
Fig. 2 is a sectional view on the line 2—2 of Fig. 1.
Figure 3:
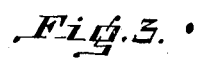
Fig. 3 is a bottom plan view of that part of the device which is mounted on the lower plate.
Figure 4:
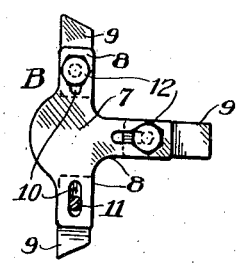
Fig. 4 is a perspective view of that part of the device shown in Fig. 3.
Figure 4:
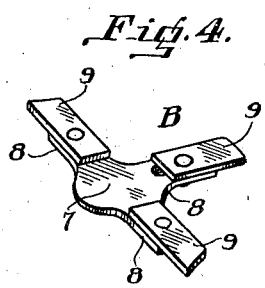
Figure 5:
Fig. 5 is a perspective view of that part of the device which is mounted on the upper plate.
Figure 6:
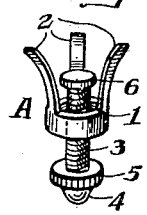
Fig. 6 is a top plan view of that part of the device shown in Fig. 5.
Figure 6:
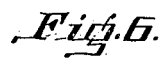

The method of operation and the mode in which the device is used may be explained as follows:

Parts A and B are seared onto upper and lower plates 16 and 17, respectively, by means of wax 18, the shorter leg 2 of A and the front arm 8 of B being towards the front of the plates. It is preferable to mount A as near the center of the upper plate as possible while B should be mounted on the lower plate so that the lateral arms 8 are about on a line with the first molars. The plates are now put into place in the patient's mouth on the upper and lower gums 14 and 15, respectively. The bolt 3 is now extended downwardly far enough so that the teeth will just barely touch towards the rear of the plates when the patient attempts to close the mouth and semi-spherical portion 4 contacts with the platform 7 of part B. The patient is asked to move his jaws and when he does so careful inspection is made to discover high points or cusps. When the high points, if any, are discovered, the plates are removed from the mouth and without disturbing the adjustment of the balancer, these high points are ground down with a carborundum stone one by one and after it is thought the points are gone, the plates are replaced in the mouth and a check is made to see if the points have been entirely eliminated. If not, the grinding is continued until they have disappeared. When the points have been removed, the plates are replaced in the mouth and the bolt 3 is turned inwardly a trifle and the patient is again asked to bite or move his mouth while the operator looks for points. The plates are again removed and the points are ground off. The plates are replaced once more and the same operations are repeated until semi-spherical portion 4 no longer touches platform 7 and the jaws are fully closed. It is found when this stage has been reached after having carefully gone through the described operations, that all teeth contact perfectly with each other thereby giving complete balanced occlusion of the dentures at all relative positions of the jaws with respect to each other. This may be checked in the ordinary way with carbon occlusion testing paper. Fig. 1 of the drawings shows an intermediate stage of the operations in which two high points 19 and 20 are disclosed. Fig. 2 shows the plates in position after perfect balanced occlusion has been obtained.

When embedded in some plastic material affixed to the roof and floor of the mouth, my invention may be utilized in the mouth to detect traumatic occlusion. This is also contemplated by my invention.

While I have described and shown certain preferred methods and means suitable therefor, it is to be understood that this is by way of illustration only and that I contemplate such further changes and modifications as come within the spirit and scope of the appended claims.

Having thus described my invention, I claim:

1. A method of obtaining balanced occlusion of dentures comprising, mounting the dentures within the patient's mouth, holding the jaws apart at a point of contact of the dentures while limiting further closing of the jaws, causing the patient to move his jaws and while so doing, detecting high cusps, and removing said cusps.

2. A method of obtaining balanced occlusion of dentures comprising, mounting the dentures within the patient's mouth, holding the jaws apart at a point of contact of the dentures while limiting further closing of the jaws, causing the patient to move his jaws and while so doing, detecting high cusps, removing said cusps, causing the jaws to be held apart somewhat closer together than before, causing the patient to move his jaws again and while so doing detecting other high cusps, and removing said other high cusps.

3. The method set forth in claim 2 with the additional steps of repeating the operations set forth at closer positions of the jaws with respect to each other until balanced occlusion and full contact of all the teeth are obtained when the jaws are fully closed.

4. An occlusion balancing device comprising a nut having a plurality of spaced apart legs for attachment to one of a set of dentures, a bolt adjustably threaded in said nut, and means attachable to the other of said set of dentures adapted to be engaged and cooperate with said bolt.

5. An occlusion balancing device comprising a plate having a plurality of arms for attachment to a denture.

6. An occlusion balancing device comprising a nut having a plurality of spaced apart legs for attachment to one of a set of dentures, a bolt adjustably threaded in said nut, said bolt being provided with a head having a semi-spherical portion thereon.

7. An occlusion balancing device comprising a nut having a plurality of spaced apart legs for attachment to one of a set of dentures, a bolt adjustably threaded in said nut, said bolt being provided with a head having a semi-spherical portion thereon, and means attachable to the other of said set of dentures adapted to be engaged and cooperate with the semi-spherical portion of said bolt.

In testimony whereof I affix my signature.

THEODORE MESSERMAN.